Dec. 25, 1923.　　　　　　　　　　　　　　　　　　1,478,393
C. F. LIVENSPARGAR
EXTERIOR ADJUSTER FOR JOURNAL BEARINGS
Filed July 7, 1922　　　2 Sheets-Sheet 1

Inventor
C. F. Livenspargar.

By Lacy & Lacy, Attorneys

Dec. 25, 1923.
C. F. LIVENSPARGAR
1,478,393
EXTERIOR ADJUSTER FOR JOURNAL BEARINGS
Filed July 7, 1922    2 Sheets-Sheet 2
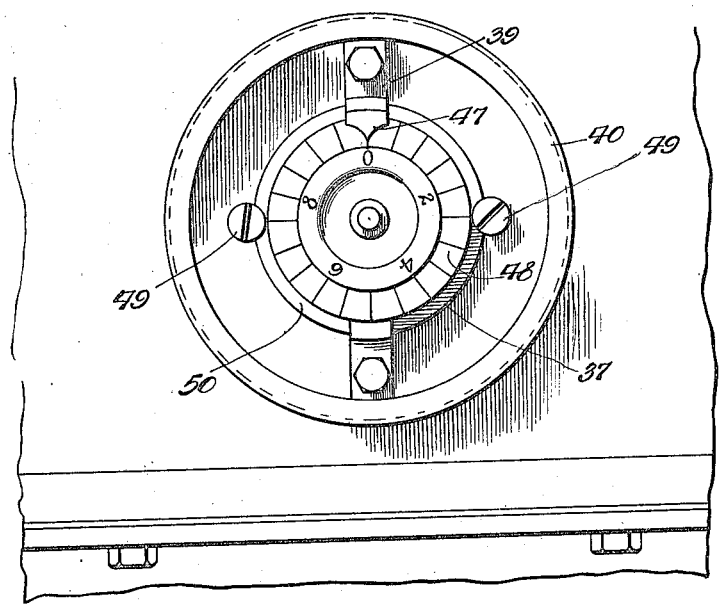
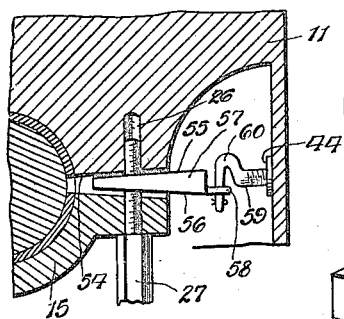
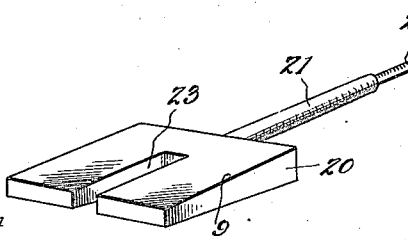
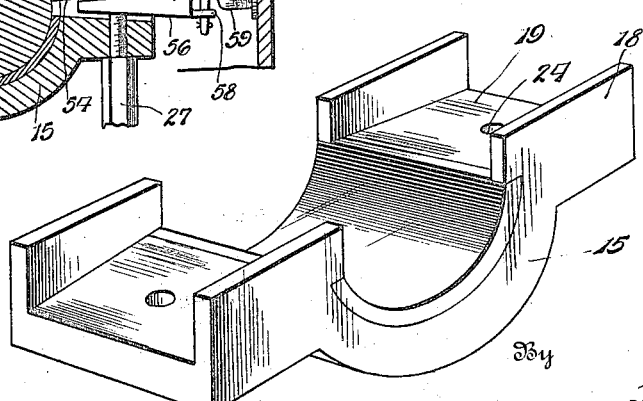
Inventor
C. F. Livenspargar.
By
Lacy & Lacy, Attorneys Patented Dec. 25, 1923.

1,478,393

UNITED STATES PATENT OFFICE.

CHARLES F. LIVENSPARGAR, OF DONIPHAN, MISSOURI.

EXTERIOR ADJUSTER FOR JOURNAL BEARINGS.

Application filed July 7, 1922. Serial No. 573,348.

*To all whom it may concern:*

Be it known that I, CHARLES F. LIVENSPARGAR, a citizen of the United States, residing at Doniphan, in the county of Ripley and State of Missouri, have invented certain new and useful Improvements in Exterior Adjusters for Journal Bearings, of which the following is a specification.

My invention relates to a device for adjusting bearings for shafts in motors having enclosed crank cases, such as are used in automobiles, motor trucks, aeroplanes, motor boats and the like.

In order to make an adjustment in the main bearing of an automobile, for instance, it is necessary to remove the crank base or bearing cap from an engine of the usual construction. This is a very tedious operation which cannot be performed without loss of lubricating oil, besides being difficult to perform in order to obtain an accurate setting.

The object of the present invention is to provide means for adjusting the bearings without removing the bearing caps for opening the crank case and to make such adjustment as close as one ten-thousandth of an inch.

One embodiment of the invention is illustrated in the accompanying drawings,—

Figure 1 showing a transverse vertical section of the main crank shaft bearing of an automobile;

Figure 3 is a partial end view of Figure 1;

Figure 4 is a perspective view of an adjusting chain;

Figure 5 is a perspective view of a bearing cap.

Fig. 6 is a modification of the adjusting mechanism shown in Fig. 1.

Figure 1:
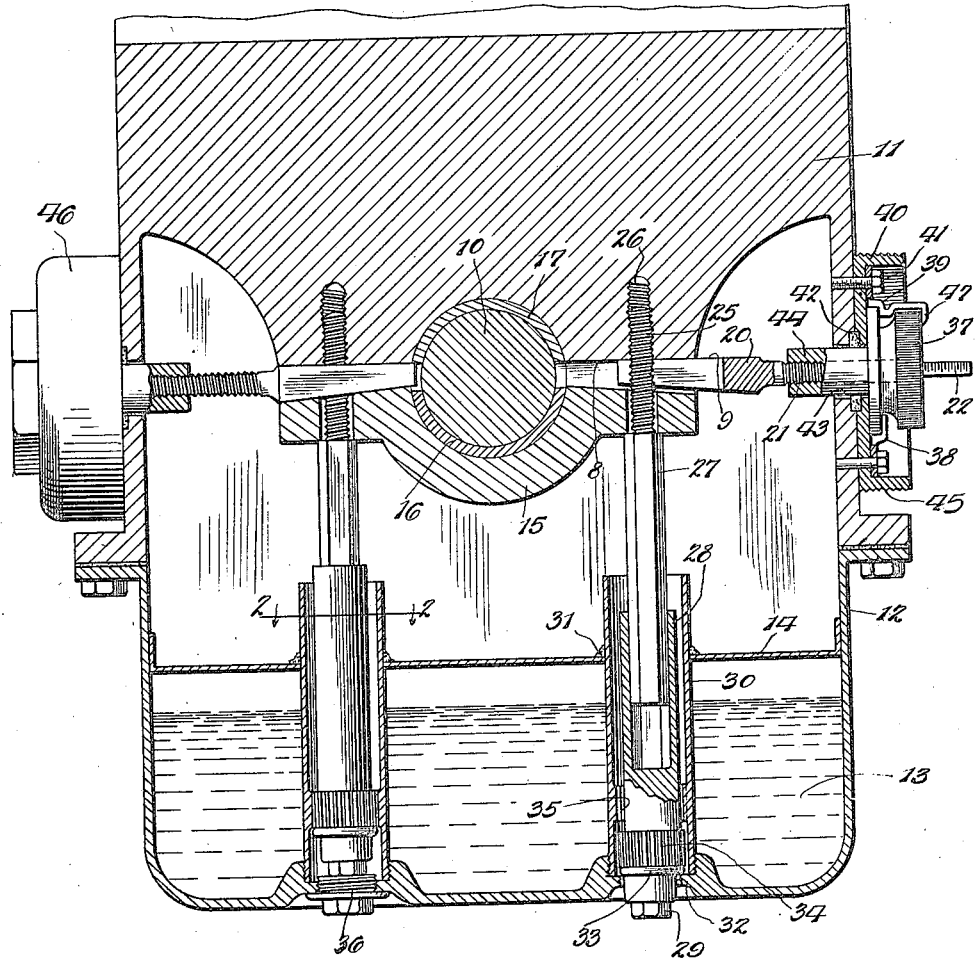
Figure 2:
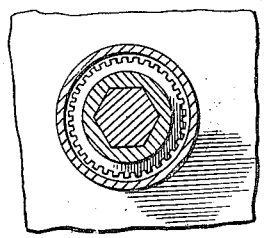
Figure 2 is a cross section on the line 2—2 of Figure 1.

In the drawings, the reference numeral 10 represents a crank shaft carried in the bearing body 11, to the lower side of which is rigidly attached the enclosing casing 12 in which the lubricating oil 13 is located. At the upper end of this casing, a splash plate 14 is secured in the side walls of the casing 12.

The bearing cap 15 is of the usual construction with the bearing metal 16 secured therein, a similar bearing metal 17 also being provided for the bearing body 11. The cap 15 has perpendicular side flanges 18 forming a guide channel between them, the bottom 19 of which slants outwardly from the journal of the crank shaft 10. Between these flanges and resting on the bottom 19 is inserted a wedge-shaped shim 20, the taper of which coincides with that of the bottom 19. The shim 20 has a shank 21 which is threaded and terminates with the index portion 22 carrying graduations. The heavy part of the shim 20 has a longitudinal slot 23 which coincides with a bolt hole 24 in the bottom of the cap 15 for the purpose of permitting a securing bolt 25 threaded, as at 26, in the bearing body 11 to pass through the shim and engage in the threaded portion 26. The top face 9 of the shim coincides with face 8 of the body 11 and is preferably horizontal.

There are shown two shims, one for each end of the cap 15 and two bolts 25 and each bolt has a head 27 of square or hexagonal cross section and extended considerably in axial direction, as best seen in Figure 1. Around this head 27 is telescopically mounted a sleeve-like wrench member 28 of considerable length and terminating with a square or hexagonal end 29 for engagement with a wrench of the usual kind. Surrounding this wrench member 28 and spaced therefrom is a pipe or sleeve 30 rigidly secured in the bottom of the casing 12 and also supported by the splash plate 14 and preferably soldered thereto, as at 31. The sleeve 30 is open at its upper end in order to permit the wrench member 28 to extend upwardly therethrough. At the lower end, a ledge 32 is provided for a collar 33 formed near the head 29 on the wrench member 28. The diameter of the ledge 32 and collar 33 is such that the wrench member 28 will be supported on the ledge 32 when the former is in its lowered position, as shown to the right in Figure 1.

Near this collar 33 are provided flutes 34 running in the longitudinal direction of the wrench member 28 and extending a short distance above the collar 33 and adapted to engage with corresponding flutes 35 provided internally in the sleeve 30. It will be observed that in the lower position of the wrench member 28, as seen to the right of Figure 1, the flutes 34 are out of engagement with the flutes 35 in the sleeve. In this position with the head 29 protruding below the bottom of the casing 12, it is now possible to turn the wrench member 28 by means of an ordinary wrench by engaging the head 29, while simultaneously the bolt 25 will be turned through the engagement between its head 27 and the sleeve portion of the wrench member 28 and in this manner it is possible to tighten or loosen the grip of the bolt on the cap 15. When the adjustment of the cap 15 and the bolt 25 has been accomplished, the wrench member 28 is pushed upwardly in the sleeve 30 into the position indicated to the left in Figure 1. In this position, the wrench member 28 engages with its flutes 34 between the flutes 35 of the sleeve 30 and the bolt 25 and the flange member 28 are in this manner held from rotating in the sleeve and the loosening of the bolt 25 is prevented. The wrench member 28 is now held in this locked position by means of a plug 36 threaded into the ledge 32 at the bottom of the casing 12.

The shank 21 on the shim 20 engages with the thumb nut 37 which is held in axial direction by means of a pair of clips 38, 39 attached together with a surrounding cup 40 by means of bolts 41 on the outside of the bearing body 11. This thumb nut 37 is free to rotate in the bearing body but a packing 42 is preferably inserted between the cup 40 and the bearing body to prevent leakage through the opening 43 through which the inwardly extending cylindrical projection 44 of the thumb nut 37 engages. The cup 40 is threaded exteriorly, as shown at 45, for the purpose of engaging with an outside cover 46 adapted to entirely conceal and protect the thumb nut 37 and the index 22 which extends beyond the outer surface of the thumb nut 37. By means of the graduations on this index portion 22, it is possible to read off, against the outer surface of the thumb nut 37, the actual displacement of the shim 20. The clamp 39 has an index point 47 adapted to co-operate with the circular graduation 48 provided on the outer face of the thumb nut 37. By means of the index and this latter graduation, a still closer observance of the displacement of the shim is possible as the graduations 48 form subdivisions of the scale on the projection portion 22 and as already pointed out one revolution of the thumb nut 37 may be made to correspond to any adjustment of one ten thousandth of an inch in the general bearing.

The reference numeral 49 represents set screws engaging with the projecting edge 50 of the thumb nut 37 and are adapted to be tightened to secure the nut and the shim 20 in adjusted position.

It will be observed that the shims 20, thumb nuts 37, bolts 25 and wrench members 28 are provided in pairs so that both ends of the cap 15 may be adjusted.

The operation of the device is as follows: When the journal bearing is found to require adjustment, the plugs 29 are first removed from the bottom of the casing 12 when incidentally the wrench members 28 will drop down exposing the heads 29 below the bottom surface of the casing 12. By means of a wrench attached to the heads 29, the wrench members 28 are now turned to loosen the bolts 25, whereupon the cap 15 will drop down a corresponding amount, thereby releasing the tight grip on the shims 20. The covers 46 are next removed, thereby exposing the thumb nuts 37 and it will now be possible to slightly withdraw the shims 20, as indicated to the right in Figure 1, care being taken that the reading on the projection 22 and the point 47 coincide at both ends of the bearing. The wrench members 28 are next turned to tighten the bolts 25 and secure the cap 15 in position tightly pinching the shims. Lastly, the plugs 29 and the covers 46 are replaced and the engine again ready for starting.

By extending the sleeves 30 above the splash plate 14, as shown in Figure 1, the possibility of leakage is prevented and only a few drops of oil may drop out from the sleeves 30 when the lugs 36 are removed.

It will be evident by supplying this external adjustment of the main bearings on an automobile or other motor driven vehicle that considerable time and labor is saved and no loss of lubricating oil or soiling of the operator's hands from grease will be necessary.

It is, moreover, obvious that a considerably closer adjustment of the journal bearing is possible by the provision of the shims and graduations for the thumb nuts and that the clamping of the cap on both sides of the journal will be accurately equalized.

In case the adjustment is found to be too tight on the journal so that the crank drags, a slight loosening of the wrench members 28 and resetting of the shims 20, as already described, may be quickly made, it being advantageous to permit the formation of the good oil film around the crank journal.

At times it may be preferable to have both top and bottom sides 55 and 56 of the wedge shaped shim 57 inclined, as illustrated in Fig. 6, in which case the bottom face 54 of the bearing block 11 has the same inclination. As, however, the shim 57 in this case will have not only a horizontal movement, but also a vertical one, upon being adjusted, and the adjusting nut 44 only permits a straight horizontal movement, a yieldable connection between the shim 57 and the threaded shank 59 is necessary. For this reason the shank 59 terminates with a hook 60 engaging in an eyelet 58 formed at the outer end of the shim 57.

Having thus described the invention, what is claimed as new is:

1. The combination with a journal bearing enclosed in a casing and provided with a bearing cap, of tapered shims inserted between the cap and the bearing body, bolts for securing the cap, elongated heads on said bolts, a wrench member for each head having telescopic engagement therewith, a sleeve secured in said casing and surrounding said wrench member, said member having a locked and an unlocked position in the sleeve, and a removable stop in said sleeve engaging with said member to hold it in its locked position.

2. The combination with a journal bearing enclosed in a casing and provided with a bearing cap, of tapered shims inserted between the cap and the bearing body, bolts for securing the cap, each of said shims having a shank extending through the wall of the casing, an adjusting nut for the shim having threaded engagement with said shank and revolubly mounted on the outside of the casing wall, graduations being provided on said shank and said nut for reading the amount of adjustment, elongated heads on said bolts, a wrench member for each head having telescopic engagement therewith, a sleeve secured in said casing and surrounding said wrench member, said member having a locked and an unlocked position in the sleeve, and a removable stop in said sleeve engaging with said member to hold it in its locked position.

3. The combination with a journal bearing enclosed in a casing and provided with a bearing cap, of tapered shims inserted between the cap and the bearing body, bolts for securing the cap, each of said shims having a shank extending through the wall of the casing, an adjusting nut for the shim having threaded engagement with said shank and revolubly mounted on the outside of the casing wall, graduations being provided on said shank and said nut for reading the amount of adjustment, elongated heads on said bolts, a wrench member for each head having telescopic engagement therewith, a sleeve secured in said casing and surrounding said wrench member, a screw plug adapted to close the outer end of said sleeve and to hold said member in raised position, and a ledge arranged to support said member in lowered position.

4. The combination with a journal bearing enclosed in a casing and provided with a bearing cap, of tapered shims inserted between the cap and the bearing body, bolts for securing the cap, each of said shims having a shank extending through the wall of the casing, an adjusting nut for the shim having threaded engagement with said shank and revolubly mounted on the outside of the casing wall, graduations being provided on said shank and said nut for reading the amount of adjustment, elongated heads on said bolts, a wrench member for each head having telescopic engagement therewith, a sleeve secured in said casing and surrounding said wrench member, a screw plug adapted to close the outer end of said sleeve and to hold said member in raised position, and a ledge arranged to support said member in lowered position, said sleeve and said member having flutes adapted to interengage when the member is in raised position.

5. The combination with a journal bearing enclosed in a casing and provided with a bearing cap, of tapered shims inserted between the cap and the bearing body, bolts for securing the cap, each of said shims having a shank extending through the wall of the casing, an adjusting nut for the shim having threaded engagement with said shank and revolubly mounted on the outside of the casing wall, graduations being provided on said shank and said nut for reading the amount of adjustment, an index point on said casing, and other graduations on said nut co-operating with said index to determine fine adjustment.

6. The combination with a journal bearing enclosed in a casing and provided with a bearing cap, of tapered shims inserted between the cap and the bearing body, bolts for securing the cap, each of said shims having a shank extending through the wall of the casing, an adjusting nut for the shim having threaded engagement with said shank and revolubly mounted on the outside of the casing wall, graduations being provided on said shank and said nut for reading the amount of adjustment, an index point on said casing, other graduations on said nut co-operating with said index to determine fine adjustment, and clamping means for said nut.

7. A journal bearing adjustment comprising shims inserted between the body and the cap of the bearing, means for displacing the shims transversely to the axis of the journal, bolts for securing the cap on said body, said bolts being provided with elongated heads, a retaining element having telescopic engagement with said head and mounted to turn therewith, and means for locking the retaining element in the bearing.

8. A journal bearing adjustment comprising tapered shims inserted between the body and the cap of the bearing, means for displacing the shims transversely to the axis of the journal, bolts for securing the cap provided with elongated heads, a wrench member for each head having keyed telescopic engagement therewith, a rigidly mounted sleeve surrounding the wrench member, and a removable stop engaging with said wrench member and holding it in locked position.

In testimony whereof I affix my signature.

CHARLES F. LIVENSPARGAR. [L. S.]